(12) United States Patent
Ogle et al.

(10) Patent No.: US 8,741,022 B2
(45) Date of Patent: *Jun. 3, 2014

(54) CONTROLLED RELEASE FERTILIZER COMPOSITION

(75) Inventors: Jeffrey Michael Ogle, Sylacauga, AL (US); Johnny Duran Sims, Sylacauga, AL (US)

(73) Assignee: Agrium Inc., Calgary, Alberta (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/477,820

(22) Filed: May 22, 2012

(65) Prior Publication Data

US 2012/0227451 A1  Sep. 13, 2012

Related U.S. Application Data

(63) Continuation of application No. 13/211,021, filed on Aug. 16, 2011, now abandoned, which is a continuation of application No. 12/833,560, filed on Jul. 9, 2010, now abandoned, which is a continuation of application No. 12/174,322, filed on Jul. 16, 2008, now Pat. No. 7,771,505.

(51) Int. Cl.
C05C 9/00 (2006.01)
C05B 7/00 (2006.01)
C05D 9/00 (2006.01)
C05D 9/02 (2006.01)

(52) U.S. Cl.
USPC ............... 71/28; 71/29; 71/30; 71/31; 71/32; 71/33; 71/34; 71/48; 71/49; 71/50; 71/53; 71/54; 71/58; 71/59; 71/60; 71/63; 71/64.07; 71/64.11

(58) Field of Classification Search
USPC ......... 71/28, 64.07, 64.11, 29, 30, 31, 32, 33, 71/34, 48, 49, 50, 53, 54, 58, 59, 60, 63
See application file for complete search history.

(56) References Cited

U.S. PATENT DOCUMENTS

| 3,295,950 A | 1/1967 | Blouin et al. |
| 3,342,577 A | 9/1967 | Blouin et al. |
| 3,576,613 A | 4/1971 | Fleming |
| RE27,238 E | 11/1971 | Stansbury et al. |
| 4,042,366 A | 8/1977 | Fersch et al. |

(Continued)

FOREIGN PATENT DOCUMENTS

| CA | 2103903 | 8/1992 |
| CA | 2105473 | 9/1992 |

(Continued)

OTHER PUBLICATIONS

"TVA's Development of Sulfur-Coated Urea", National Fertilizer Development Center, Muscle Shoals, AL, Aug. 1974.

(Continued)

*Primary Examiner* — Wayne Langel
(74) *Attorney, Agent, or Firm* — Kagan Binder, PLLC

(57) ABSTRACT

A controlled release fertilizer composition and methods to produce the controlled release fertilizer composition are described. The controlled release fertilizer composition comprises a water soluble fertilizer core that is coated with a polymeric layer, intermediate layer, and a sulfur layer. If desired, the sulfur layer can be coated with an outer water-insoluble layer.

28 Claims, 1 Drawing Sheet

(56) References Cited

U.S. PATENT DOCUMENTS

| | | | |
|---|---|---|---|
| 4,082,533 | A | 4/1978 | Wittenbrook et al. |
| 4,133,789 | A | 1/1979 | Lakshmanan |
| 4,219,347 | A | 8/1980 | Young |
| 4,481,308 | A | 11/1984 | Gray |
| 4,676,821 | A | 6/1987 | Gullett et al. |
| 4,711,659 | A | 12/1987 | Moore |
| 4,804,403 | A | 2/1989 | Moore |
| 4,853,465 | A | 8/1989 | Cowan et al. |
| 4,857,098 | A | 8/1989 | Shirley, Jr. |
| H1085 | H | 8/1992 | Simmons et al. |
| 5,209,465 | A | 5/1993 | Sayama et al. |
| 5,264,019 | A | 11/1993 | Gossett, Jr. et al. |
| 5,300,135 | A | 4/1994 | Hudson et al. |
| 5,374,292 | A | 12/1994 | Detrick et al. |
| 5,405,426 | A | 4/1995 | Timmons et al. |
| 5,423,897 | A | 6/1995 | Hudson et al. |
| 5,466,274 | A | 11/1995 | Hudson et al. |
| 5,476,528 | A | 12/1995 | Trimm et al. |
| 5,478,375 | A | 12/1995 | Hudson |
| 5,538,531 | A * | 7/1996 | Hudson et al. ............... 71/28 |
| 5,599,374 | A | 2/1997 | Detrick |
| 5,653,782 | A | 8/1997 | Stern et al. |
| 5,698,003 | A | 12/1997 | Omilinsky et al. |
| 5,750,130 | A | 5/1998 | Ferrell et al. |
| 5,851,261 | A | 12/1998 | Markusch et al. |
| 5,939,356 | A | 8/1999 | Wellinghoff |
| 5,984,994 | A | 11/1999 | Hudson |
| 5,993,505 | A | 11/1999 | Tijsma et al. |
| 6,039,781 | A | 3/2000 | Goertz et al. |
| 6,080,221 | A | 6/2000 | Moore |
| 6,152,981 | A | 11/2000 | Markusch et al. |
| 6,165,550 | A | 12/2000 | Markusch et al. |
| 6,176,891 | B1 | 1/2001 | Komoriya et al. |
| 6,231,633 | B1 | 5/2001 | Hirano et al. |
| 6,284,278 | B1 | 9/2001 | Waldman et al. |
| 6,322,606 | B1 | 11/2001 | Komoriya et al. |
| 6,338,746 | B1 | 1/2002 | Detrick et al. |
| 6,358,296 | B1 | 3/2002 | Markusch et al. |
| 6,364,925 | B1 | 4/2002 | Markusch et al. |
| 6,365,120 | B1 | 4/2002 | Granquist |
| 6,475,259 | B1 | 11/2002 | Thomas et al. |
| 6,617,412 | B2 | 9/2003 | Markusch et al. |
| 6,663,686 | B1 | 12/2003 | Geiger et al. |
| 7,267,707 | B2 * | 9/2007 | Rosenthal et al. ............ 71/64.11 |
| 7,494,525 | B2 | 2/2009 | Hojjatie et al. |
| 7,771,505 | B2 | 8/2010 | Ogle et al. |
| 2002/0045727 | A1 | 4/2002 | Weyer et al. |
| 2002/0098982 | A1 | 7/2002 | Burnham |
| 2003/0033843 | A1 | 2/2003 | Tabei |
| 2003/0051523 | A1 | 3/2003 | Tabei |
| 2004/0016276 | A1 * | 1/2004 | Wynnyk et al. ............... 71/64.11 |
| 2004/0020114 | A1 | 2/2004 | Boehmer et al. |
| 2004/0023809 | A1 * | 2/2004 | Wertz et al. .................... 504/360 |
| 2005/0066697 | A1 | 3/2005 | Cline et al. |
| 2005/0144997 | A1 | 7/2005 | Phillips et al. |
| 2007/0137274 | A1 | 6/2007 | Wynnyk et al. |
| 2008/0196463 | A1 * | 8/2008 | Hudson et al. ..................... 71/28 |
| 2010/0275665 | A1 | 11/2010 | Ogle et al. |
| 2011/0296884 | A1 | 12/2011 | Ogle et al. |
| 2012/0240648 | A1 | 9/2012 | Ogle et al. |

FOREIGN PATENT DOCUMENTS

| | | |
|---|---|---|
| CA | 2275887 | 7/1998 |
| CN | 1919805 | 2/2007 |
| CN | 1927778 | 3/2007 |
| CN | 1948227 | 4/2007 |
| CN | 1958533 | 5/2007 |
| CN | 1958535 | 5/2007 |
| CN | 1962569 | 5/2007 |
| EP | 0571532 | 5/1997 |
| EP | 0730565 | 3/2001 |
| EP | 1195365 | 4/2002 |
| EP | 0948474 | 6/2002 |
| GB | 1157400 | 7/1969 |
| JP | 11-228274 | 8/1999 |
| WO | 92/14690 | 9/1992 |
| WO | 94/29239 | 12/1994 |
| WO | 2007/022732 | 3/2007 |
| WO | 2007/025462 | 3/2007 |

OTHER PUBLICATIONS

Examination Report, Intellectual Property Office of New Zealand, issued Jun. 15 2011, 2 pages.
Paper 1 "Declaration 37 CFR §41.203(b)" from Interference 105,797, *Agrium, Inc. v. Alice P. Hudson and James E. Nevin*, Jul. 14, 2011, 6 pages.
Paper 17 "Redeclaration" from Interference 105,797, *Agrium, Inc. v. Surface Chemists of Florida, Inc.*, Aug. 15, 2011, 3 pages.
Paper 24 "Redeclaration" from Interference 105,797, *Agrium, Inc. v. Surface Chemists of Florida, Inc.*, Sep. 16, 2011, 2 pages.
Paper 345 "Decision" from Interference 105,797, *Agrium, Inc. v. Surface Chemists of Florida, Inc.*, Jul. 3, 2013, 23 pages.
Paper 346 "Judgment" from Interference 105,797, *Agrium, Inc. v. Surface Chemists of Florida, Inc.*, Jul. 30, 2013, 3 pages.
International Search Report and Written Opinion, International Application No. PCT/CA2009/000110, mailed May 7, 2009.

* cited by examiner

CONTROLLED RELEASE FERTILIZER COMPOSITION

CROSS REFERENCE TO RELATED APPLICATION

This application is a continuation of U.S. application Ser. No. 13/211,021 filed on Aug. 16, 2011, which was a continuation of U.S. application Ser. No. 12/833,560 filed on Jul. 9, 2010, which was a continuation of U.S. application Ser. No. 12/174,322 filed on Jul. 16, 2008, issued as U.S. Pat. No. 7,771,505 on Aug. 10, 2010, all of which incorporated herein by reference in their entirety.

FIELD OF INVENTION

This invention relates to controlled release fertilizers.

BACKGROUND OF THE INVENTION

Fertilizers have been used for many years to supplement nutrients in growing media. In recent years the art has focused on techniques to deliver controlled amounts of plant nutrients to the soil or other growing media. It is recognized, for example, that controlling the release of plant nutrients such as nitrogen from highly soluble fertilizer granules is desirable because releasing the nutrients over an extended period of time achieves advantages which include increased efficiency of fertilizer use by plants, reduced application costs since fewer applications of fertilizer are required and reduced nutrient loss caused by leaching and denitrification. The coating of sulfur on the surface of the fertilizer granules may reduce the dissolution rate of the granules and impart controlled-release characteristics. In essence, the water in the soil, and rain water are kept away from the very soluble fertilizer until a granule develops a flaw such as a crack or fissure in the coating, or the coating is penetrated by microbial action.

Due to the inherent brittleness of the crystalline solid sulfur-coating which forms on the granule, and the thin, or even non-continuous coating on many of the granules, it is essential that some type of secondary outer coating or sealant be applied onto the sulfur-coated surface. This sealant conventionally is either a polymeric hydrocarbon, petroleum-based wax, or a combination of high viscosity polymeric paraffinic oil plus polyethylene, which is spray applied as a hot melt liquid onto the hot, but solidified sulfur-coating surface. Although these sulfur coated fertilizers have received substantial uses, there are problems from the standpoint of obtaining uniform coating thicknesses, predictable release characteristics resulting from cracks in the sulfur coatings, essential abrasion and impact resistance, and the complexity of the processing steps.

More recently, because of problems associated with sulfur coated fertilizers, such as above defined, polymer coated fertilizers have received substantial attention, particularly in view of the improved controlled release properties obtained with certain polymer coated fertilizers at lower coat weights.

U.S. Pat. No. 5,538,531 (Hudson) teaches a controlled release, particulate fertilizer product having a water soluble fertilizer central mass encased in a plurality of water insoluble, abrasion resistant coatings. At least one inner coating is a urethane reaction product derived from reacting recited isocyanates and polyols. The outer coating is formed from an organic wax.

U.S. Pat. No. 6,358,296 (Markusch et al.) teaches a slow-release polyurethane encapsulated fertilizer using oleo polyol(s). U.S. Pat. No. 5,851,261 (Markusch et al.) provides a process for the production of polyurea encapsulated fertilizer particles comprising applying an isocyanate-reactive component containing at least two amine groups to the fertilizer particles, and applying a polyisocyanate to the amine coated particles to form polyurea coated particles.

Sulfur containing isocyanate compositions and a process for the production of encapsulated fertilizer compositions are described in U.S. Pat. No. 6,152,981 (Markusch et al). The fertilizer compositions are prepared by applying a mixture of sulfur and an isocyanate to the fertilizer and then applying an isocyanate-reactive material. U.S. Pat. No. 5,599,374 (Detrick) describes a fertilizer composition wherein a sulfur coating is applied to a fertilizer core, and thereafter a polymer coating is applied over the sulfur.

U.S. Pat. No. 6,231,633 (Hirano et al.) teaches a granular fertilizer coated with a thermosetting resin coating that may be urethane and a hydrophobic compound, which may be wax. U.S. Pat. No. 6,663,686 (Geiger et al.) teaches a slow-release polyurethane encapsulated fertilizer using polyurethane and wax.

It is also known in the art to pre-coat particulate plant nutrient with organic oil and particles as a means to improve the release profiles of the particulate plant nutrient (U.S. Pat. No. 6,039,781; Goertz et al.).

U.S. Pat. No. 6,338,746 (Detrick et al.) describes a process of first coating a fertilizer with a polymer, then coating the polymer with sulfur and thereafter applying a polymer coating. The polymers are described in U.S. Pat. Nos. 4,711,659 (Moore), 4,804,403 (Moore) and 5,374,292 (Detrick). These polymers require that the substrate contains a minimum quantity of reactive —$NH_2$ groups. Thus, these are not applicable to all fertilizer compositions for which slow release properties may be desirable.

Although polymer coated fertilizers as above described have received substantial attention, they are expensive to manufacture. There is a need in the art to provide controlled released fertilizer formulations that are abrasion resistant, and that reduce the cost of fertilizer production.

SUMMARY OF THE INVENTION

The present invention relates to controlled release fertilizer.

The present invention provides a controlled release fertilizer composition that comprises a water-soluble central core of a plant nutrient compound in particulate form, a polymer coating on the plant nutrient, an intermediate layer (IL) on the layer of polymer, and a layer of elemental sulfur on the intermediate layer. The controlled release fertilizer composition may include an outer-water insoluble layer on the layer of elemental sulfur. The central core plant nutrient may be urea. The polymer layer may be a thermoset polymeric layer. The intermediate layer and the outer water-insoluble layer may be the same or different, and be selected from the group consisting of a petroleum product, a wax, a paraffin oil, a bitumen, an asphalt, a lubricant, a coal product, an oil, canola oil, soybean oil, coconut oil, linseed oil, tung oil, vegetable wax, animal fat, animal wax, a forest product, tall oil, modified tall oil, tall oil pitch, pine tar, a synthetic oil, a synthetic wax, a synthetic lubricant, an ethylene-vinyl acetate copolymer, an ethylene-acrylic acid copolymer; an ethylene-ethyl acrylate copolymer, an ethylene-vinyl alcohol copolymer, ethylene-vinyl, alcohol-vinyl acetate terpolymers, a surfactant, soap and a combination thereof.

The present invention also provides a controlled release fertilizer composition as described above, that comprises the plant nutrient compound of from about 37% N to about 44%

N on a weight basis, the polymer layer of from about 1.2% to about 3.0% on a weight basis, the intermediate layer of from about 0.1 to about 0.8% on a weight basis, and the layer of elemental sulfur of from about 1.7% to about 15% on a weight basis. Furthermore, if the controlled release fertilizer composition comprises an outer water insoluble layer, then this layer comprises from about 0.1 to about 0.8% by weight.

The present invention also relates to a method of producing a controlled release fertilizer composition that comprises, coating a plant nutrient compound with two or more than two precursor compounds reactive to form a polymer, applying an intermediate layer onto the polymer, and spraying molten sulfur onto the intermediate layer to form a sulfur layer. An outer water insoluble layer may be applied over the sulfur layer. The polymer may be a thermoset polymer, and the step of coating the plant nutrient compound with two or more than two precursor compounds reactive to form a polymer may be at a temperature sufficient to thermoset the polymer.

The present invention pertains to the process as described above, that comprises the plant nutrient compound of from about 37% N to about 44% N on a weight basis, the polymer layer of from about 1.2% to about 3.0% on a weight basis, the intermediate layer of from about 0.1 to about 0.8% on a weight basis, and the layer of elemental sulfur of from about 1.7% to about 15% on a weight basis. Furthermore, if the controlled release fertilizer composition comprises an outer, water-insoluble layer, then this layer comprises from about 0.1 to about 0.8% by weight The polymer layer may be a thermoset polymeric layer.

The controlled release fertilizers described herein exhibit impact and abrasion resistance, are manufactured at low cost, and undergo controlled release of the fertilizer core in a manner consistent with the requirements within the industry for a controlled release fertilizer composition, and similar to controlled release formulation characteristics as known in the prior art. By removing the outer layer of a thermoset polymer as described in the prior art (for example U.S. Pat. No. 6,338, 746), and by utilizing a thermoset polymer coating on the innermost layer that coats the fertilizer core, a lower amount of the precursor monomer compounds that are required to form the thermoset polymer layer is required. Furthermore, the combination of one or more than one intermediate layer in combination with the sulfur layer that coats a polymer layer, ensures that the amount of polymer coating can be reduced. The intermediate layer component and the sulfur are relatively inexpensive compared to the polymer coating. This provides a significant saving in the costs associated with producing the controlled release fertilizer composition, and permits an increase in the amount of fertilizer component, on a weight basis, present in the final fertilizer composition. Compositions comprising 37% N to 44% N, and having desired controlled release properties, can be obtained using the methods described herein.

Furthermore, fertilizer compositions of the prior art that comprise a polymeric outer coat require an amount of set or cure time of the polymeric layer prior to handling and packaging the fertilizer. This requires a step of storing the fertilizer composition following manufacture and prior to packaging. After the outer polymeric layer is set, then the fertilizer composition may be packaged. By removing the outer polymeric coating layer, the fertilizer composition of the present invention can be packaged following production, and does not require a step of setting or curing the outer coat. Therefore, the controlled released fertilizer composition, and the methods to produce this fertilizer, as described herein, increase production efficiency.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 1A shows the release of several examples of fertilizer compositions prior to an impact test. FIG. 1B shows the release of several examples of fertilizer compositions after the impact test

DETAILED DESCRIPTION

Figure 1A:
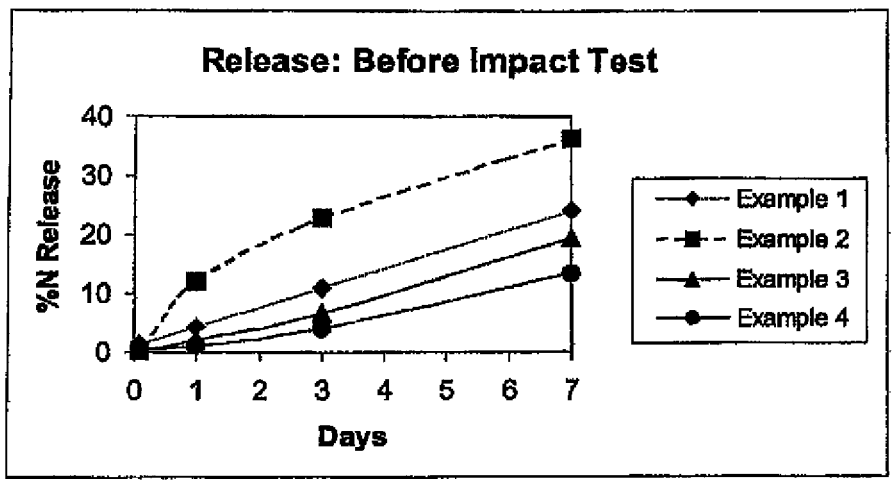
FIGS. 1A and 1B show a time course of fertilizer release.

This invention relates to controlled release fertilizers.

The present invention relates to a controlled release fertilizer composition comprising a particulate plant nutrient surrounded by a series of coatings comprising in series from the inside out, a polymer layer, an intermediate layer (IL), a sulfur layer and if desired, an outer water-insoluble layer.

The choice of particulate plant nutrient material useful for the present controlled release fertilizer material is not to be restricted. The present fertilizer material has been described primarily with reference to urea as the plant nutrient. As will be apparent to one skilled in the art, however, other nutrients, including micronutrients can be used to prepare the controlled release fertilizer compositions in accordance with the present invention. For example, the plant nutrient material may be selected from the group consisting of nitrogen, phosphorus, potassium, sulfur, micronutrients and mixtures thereof. Other fertilizer materials can be utilized, for example, but not limited to ammonium phosphate, ammonium sulfate and mixtures thereof or granule mixture of basic fertilizer materials. Non-limiting examples of useful micronutrients may be selected from the group comprising of copper, zinc, boron, manganese, iron and mixtures thereof.

Urea is characterized as having functional reactive groups at the surface of the urea which may be used to react with a diisocyanate when forming the polymer layer. This reaction causes the polymer layer to be chemically bonded to the urea. However, according to the present invention, it is not required that the polymer layer be bonded to the urea material.

The amount of fertilizer present within the controlled release fertilizer composition as describe herein may vary from about 37% N to about 45% N, by weight, or any amount therebetween, based on the weight of the fertilizer composition, for example 37% N, 38% N, 39% N, 40% N, 41% N, 42% N, 43% N, 44% N, by weight, or any amount there between, based on the weight of the fertilizer composition. Using the components of the controlled release fertilizer composition and the method to produce the controlled release fertilizer as described herein, high yielding fertilizers have been routinely produced comprising 42% N to 43% N nitrogen (N).

The fertilizer core of the controlled release fertilizer composition of the present invention is coated with a polymeric coating. Examples of polymeric coatings (see Concise Encyclopedia of Chemical Technology (CECT), Wiley InterScience, 1985) include polyurethane or coatings comprising polyesters such as alkyd (pp. 70-71 of CECT), or a modified alkyd resin (pp. 70-71 of CECT), epoxy resins (pp. 431-433 of CECT), aminoplastic resins (pp. 90-91 of CECT), ureaformaldehyde thermosets (pp. 9-92 of CECT, melamine-formaldehyde thermosets (pp. 90 of CECT), phenolic thermosets (pp. 867-868 of CECT), polyimide thermosets (pp.

932-933 of CECT), unsaturated polyester thermosets (pp. 926-927 of CECT) and mixtures thereof. The polymeric coating can be a thermosetting polymeric coating.

The polymeric layer of the controlled release fertilizer of the present invention may for example be a polyurethane, and this coating may be produced using two or more than two precursor compounds. For example, one of the precursor compounds may be an isocyanate, for example a diisocyanate, or a polyisocyanate. A non-limiting example of a diisocyanate is polymeric MDI (4,4 diphenylmethane diisocyanate), however, other poly-functional isocyanates can be utilized as described in U.S. Pat. No. 4,804,403 (Moore; see for example Column 8, line 64 to Column 9, line 27 and Example 1; which is incorporated herein by reference), and include aliphatic, aromatic, and aliphatic aromatic polyisocyanates. Isocyanates contain two or more —NCO groups available for reaction and, as known to one skilled in the art, are widely used in the production of urethane polymers. Non-limiting examples of suitable isocyanates include: 1,6-hexamethylene diisocyanate, 1,4-butylene diisocyanate, furfuryurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitoluene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof.

The second of the two or more than two precursor compounds used to form the polymeric coating as described herein, may include a polyol, for example as described in U.S. Pat. No. 4,804,403 (Moore; see for example; Column 9, lines 3-20, and example 1 which is incorporated herein by reference). Non limiting examples of a polyol include diethylene glycol polyol, ethylene glycol, polypropylene glycol, organic polyols, for example as described in U.S. Pat. No. 4,804,403 (Moore; which is incorporated herein by reference), orthophathalate diethylene glycol based polyester polyols, terephthalate-diethylene glycol based polyester polyols, castor oil and oils modified to contain amine or OH groups, for example modified tong oil, soybean oil, canola oil, sunflower oil, linseed oil, (e.g. U.S. Pat. No. 6,364,925 see for example Markusch et al; see for example Column 8 line 39 to Column 9, line 27 and the examples; and U.S. Pat. No. 6,358,296, Markusch et al, see for example Column 9 lines 1 to 13, and the examples; which are incorporated herein by reference), oleo-polyols, for example an epoxidized castor oil, epoxidized sunflower oil, epoxidized linseed oil as described in U.S. Pat. No. 6,358,296 (Markusch et al.; which is incorporated herein by reference), polyether polyols, castor oil derivatives for example partial hydrolysates of castor oil, by reacting castor oil with a polyol selected from diols (e.g. ethylene glycol, propylene glycol, 1,4-butanediol, neopentyl glycol, 1,6-hexanediol, diethylene glycol, dipropylene glycol, polyethylene glycol, and polypropylene glycol), glycerol, trimethylolpropane, and polyether polyol, or esters formed by reactions between ricinoleic acid and the polyol selected from these compounds as described in U.S. Pat. No. 6,176,891 (Komoriya et al.; see for example Column 7, lines 4 to 16, Column 8, lines 49 to 62; which is incorporated herein by reference), or combinations thereof.

It is not required that the polymer coating as used herein be based on an isocyanate or polyol. The polymer can be virtually any polymer which is thermoset and which can be applied to the plant nutrient and provide a controlled release characteristic, or a portion of the controlled release characteristic to the fertilizer composition.

The polymer coating that surrounds the plant nutrient material is present in an amount in the range of from about 0.5% to about 3.0% by weight, or any amount therebetween, of the final fertilizer composition. For example, the polymeric coating may comprise from about 0.5% to about 2.5% by weight, or any amount therebetween, of the final fertilizer composition, from about 1.2 to about 1.8% by weight, or any amount therebetween, based on the weight of the fertilizer composition, or from about 0.5, 0.7, 1.0, 1.2, 1.4, 1.6, 1.8, 2.0, 2.2, 2.4, 2.6, 2.8, 3.0% by weight, or any amount therebetween, based on the weight of the fertilizer composition.

The polymer coating as described above is coated with a material that facilitates the application of sulfur. This coating is herein referred to as intermediate layer (IL). Preferred materials that may be used for the intermediate layer include but is not limited to a petroleum product, a wax, a paraffin oil, a bitumen, an asphalt, a lubricant, a coal product, an oil, canola oil, soybean oil, coconut oil, linseed oil, tung oil, vegetable wax, animal fat, animal wax, a forest product, tall oil, modified tall oil, tall oil pitch, pine tar, a synthetic oil, a synthetic wax, a synthetic lubricant, an ethylene-vinyl acetate copolymer, an ethylene-acrylic acid copolymer; an ethylene-ethyl acrylate copolymer, an ethylene-vinyl alcohol copolymer, ethylene-vinyl alcohol-vinyl acetate terpolymers, a surfactant, a soap and a combination thereof.

The polymer coat and intermediate layer may be applied as a pre-mixture, for example as described in U.S. Pat. No. 6,663,686 (which is incorporated herein by reference; see Columns 2-6), prior to the addition of the sulfur layer. In this example, the wax component of the polymer—wax pre-mixture may comprise from about 10 to about 60 wt % (of the total combination of polymer and wax) or any amount therebetween, of the polymer-wax pre-mixture, for example 40-60 wt % (of the total combination of polymer and wax), or any amount therebetween or 10, 15, 20, 25, 30, 35, 40, 45, 50, 55, 60 wt % (of the total combination of polymer and wax), or any amount therebetween.

If the fertilizer composition is to comprise an outer, water-insoluble layer then the inner intermediate layer, and the outer water-insoluble layer may comprise the same or different components.

If a wax is used for the intermediate layer, the outer water-insoluble layer, or both the intermediate layer and the outer water-insoluble layer, then the wax may be a single type of wax or a mixture of different waxes. For example, the wax may be selected from an intermediate petroleum wax, an alpha olefin wax, a polyethylene wax, a paraffin wax, a silicon wax, a slack wax, a microcrystalline wax, and a natural wax. Non limiting waxes that may be used in the compositions of the controlled release fertilizer of the present invention include those described in U.S. Pat. No. 5,538,531 (Hudson; see for example Column 5, lines 13 to 27 and the examples; which is incorporated herein by reference). The wax may comprise a drop melting point temperature of between about 60° C. and 80° C., or any temperature therebetween, for example 60, 62, 64, 66, 68, 70, 72, 74, 76, 78, 80° C., or any temperature therebetween.

The intermediate layer that surrounds the polymer coated plant nutrient material may be present in an amount in the range of from about 0.1% to about 1.0%, or any amount therebetween, based on the weight of the fertilizer composition. For example, the water-insoluble layer may be present from about 0.2 to about 0.5% or any amount therebetween, based on the weight of the fertilizer composition, or from 0.1, 0.2, 0.4, 0.6, 0.8, 1.0% or any amount therebetween, based on the weight of the fertilizer composition. A non limiting example of the amount of the intermediate layer is about 0.3% by weight of the fertilizer composition, in this example, the intermediate layer may be an intermediate petroleum wax. However, an oil, a grease, a wax, or a blend thereof may be used as indicated above.

The intermediate layer may be applied to the polymer coated fertilizer while the fertilizer core and the polymer coating is still hot, for example from about 120° F. to about 250° F., or any temperature therebetween. As this temperature is above the melting point for some of components that may be used for the intermediate layer, the intermediate layer may form a coating around the polymeric layer in a liquid state. The thickness and amount of the intermediate layer on the polymer coat may be modified by the amount of intermediate layer applied, and by controlling the temperature of the fertilizer core and the polymer coated core.

The intermediate layer material, the outer water insoluble layer material, or both the intermediate layer material and the outer water insoluble layer material, may be selected from the group of a petroleum product, for example but not limited to wax, for example but not limited to a petroleum wax, paraffin oil, bitumen, asphalt, lubricants and a combination thereof. The intermediate layer may also be selected from the group including but not limited to a coal product, a coal-derived oil, a coal-derived lubricant, a coal-derived bitumen, a coal-derived wax, and a combination thereof, or a natural product for example but not limited to vegetable oil, for example but not limited to, canola oil, soybean oil, coconut oil, sunflower oil, castor oil, linseed oil, tung oil, vegetable wax, animal fat, animal wax, a forest product, such as tall oil, modified tall oil, tall oil pitch, pine tar and combinations thereof. Synthetic products for example but not limited to synthetic oils, synthetic waxes, synthetic lubricants, and combinations thereof may also be used for an intermediate layer. Mixtures of materials from two or more classes listed above may also be used, for example a petroleum product, a coal product, a natural product, a synthetic product and a combination of these materials. Furthermore, the material may be available as by-products from an industrial process. The intermediate layer material of the present—fertilizer may also be selected from a soap, a surfactant, or a combination thereof.

Without wishing to be bound by theory, the intermediate layer may act as a lubricant when applying the sulfur layer. The use of an intermediate layer may ensure an even coating of sulfur during production of the controlled release fertilizer composition, and may minimize the amount of sulfur that needs to be applied to the controlled release fertilizer composition. Therefore, materials that function in a lubricating capacity may be used as a component of the intermediate layer.

As noted above, the intermediate layer material may be oil, a wax and an oil in combination, or another lubricating agent in combination with a wax, an oil, or a combination thereof. If an oil is to be used, either alone or in combination with a wax or other lubricant, then it is preferred that the oil be in a liquid state from about 120° F. to about 250° F., or any temperature therebetween, for example 120, 125, 130, 135, 140, 145, 150, 155, 160, 165, 170, 175, 180, 185, 190, 195, 200, 205, 210, 215, 220, 225, 230, 240, 245, 250° C., or any temperature therebetween.

If an outer, water-insoluble layer is used to surround the sulfur layer, then the outer, water-insoluble layer is present in an amount of from about 0.1% to about 1.5%, or any amount therebetween, based on the weight of the fertilizer composition. For example, the water-insoluble layer may be present from about 0.2 to about 0.8% or any amount therebetween, based on the weight of the fertilizer composition, or from 0.1, 0.2, 0.4, 0.6, 0.8, 1.0, 1.2, 1.5% or any amount therebetween, based on the weight of the fertilizer composition.

A non limiting example of the amount of the water-insoluble layer is about 0.5% by weight of the fertilizer composition, in this example, the water-insoluble layer may be an intermediate petroleum wax. The wax may comprise a drop melting point temperature of between about 60° C. and 80° C., or any temperature therebetween. For example, 60, 62, 64, 66, 68, 70, 72, 74, 76, 78, 80° C., or any temperature therebetween.

The outer water-insoluble layer may be used to minimize the amount of sulfur dust that is produced during handling of the controlled release fertilizer composition. The water-insoluble layer also increases the abrasion resistance of the fertilizer composition, and functions in controlling the release of the fertilizer within the controlled release fertilizer composition when the fertilizer composition is exposed to water. The outer water-insoluble layer may act as a hydrophobic layer which protects moisture from entering cracks in the sulfur coating.

The outer water-insoluble layer should contain less than about 5% oil, in order to ensure that the layer hardens appropriately to facilitate proper handling of the final fertilizer product.

The sulfur layer surrounds the wax coating of the polymer coated plant nutrient material, in an amount in the range of from about 1.7% to about 15%, or any amount therebetween, based on the weight of the fertilizer composition. For example the sulfur coating may comprise from about 2% to 4%, or any amount therebetween, based on the weight of the fertilizer composition, from about 2.2% to 3.8%, or any amount therebetween, based on the weight of the fertilizer composition, or from about 1.7, 1.9, 2.0, 2.2, 2.4, 2.6, 2.8, 3.0, 3.2, 3.4, 3.6, 3.8, 4.0, 4.2, 4.4, 4.6, 4.8, 5.0, 5.2, 5.4, 5.6, 5.8, 6.0, 6.2, 6.4, 6.6, 6.8, 7.0, 7.2, 7.4, 7.6, 7.8, 8.0, 8.2, 8.4, 8.6, 8.8, 9.0, 9.2, 9.4, 9.6, 9.8, 10.0, 10.2, 10.4, 10.6, 10.8, 11.0, 11.2, 11.4, 11.6, 11.8, 12.0, 12.2, 12.4, 12.6, 12.8, 13.0, 13.2, 13.4, 13.6, 13.8, 14.0, 14.2, 14.4, 14.6, 14.8, 15%, or any amount therebetween, based on the weight of the fertilizer composition.

Therefore, the present invention provides a controlled release fertilizer composition that comprises a plant nutrient compound of from about 37% N to about 44% N on a weight basis, a polymer layer of from about 1.2% to about 3.0% on a weight basis, an intermediate layer of from about 0.1 to about 0.8% on a weight basis, and the layer of elemental sulfur of from about 1.7% to about 15% on a weight basis. The controlled release fertilizer composition may also comprise an outer, water-insoluble layer of from about 0.1 to about 0.8% by weight.

The present invention also provides a method of producing a controlled release fertilizer composition that comprises, coating a plant nutrient compound with two or more than two precursor compounds that react to form a polymer, applying an intermediate layer onto the polymer, and spraying molten sulfur onto the intermediate layer to form a sulfur layer. An outer, water-insoluble layer may be applied over the sulfur layer. If the polymer is a thermosetting polymer, then the polymer is coated at a temperature sufficient to form a thermoset polymer.

The controlled release fertilizer composition may be produced using a first rotating drum comprising precursor components to produce a polymer layer over top of fertilizer granules. In this procedure, fertilizer granules, having a size range from about 1.0 mm to about 3.0 mm, or any size therebetween, for example about 1.5 mm to about 2 0 mm or any size therebetween, for example 1.0, 1.2, 1.4, 1.5, 1.6, 1.8, 2.0, 2.2, 2.4, 2.5, 2.6, 2.8, 3.0 mm or any size therebetween, are fed from a storage area, onto a conveyor and fed into a rotating drum, or a pre-heater. If a drum is used, in a first section of the rotating drum, the fertilizer granules, may be preheated to about a temperature between 120° F. and 250° F., or any temperature therebetween, for example from about 150° F. to about 200° F., or about 120, 125, 130, 135, 140, 145, 150, 155, 160, 165, 170, 175, 180, 185, 190, 195, 200, 205, 210, 220, 240, 230, 240, 250° F., or any amount therebetween, for example about 170° F. The heated granules are then coated separately with precursor compounds to produce the polymer coating. For example if the polymer is a thermoset polymer, then polymeric MDI (4,4 diphenylmethane diisocyanate), and a mixture of TEA (triethanolamine) and DEG (diethylene glycol)polyols, are blended and applied to the fertilizer granules, and the polymer components polymerize on the surface of the granules to form a polymer coating.

In a second coating step the polymer coated granules are brought into contact with am intermediate layer material for example but not limited to a wax, an oil, a grease, or a combination thereof, at a temperature of about 120° F. to about 250° F., or any temperature therebetween, for example from about 150° F. to about 200° F., about 170° F., or about 120, 125, 130, 135, 140, 145, 150, 155, 160, 165, 170, 175, 180, 185, 190, 195, 200, 205, 210, 220, 240, 230, 240, 250° F., or any amount therebetween, for example about 160° F., which is applied onto the polymer coated granule.

The polymer and intermediate layer-coated urea is withdrawn from the first drum onto a conveyor and fed to a conveyor leading into a second rotating drum In a continuous process, the coated granules are then brought into contact with molten sulfur at a temperature of from about 240° F. to about 310° F., or any temperature therebetween, for example from about 240, 250, 260, 270, 280, 290, 300, 310° F., or any amount therebetween, for example about 290° F. which is sprayed over top of the intermediate layer coating of the polymer coated granule. The molten sulfur forms a solid sulfur layer over the intermediate layer.

If desired, an outer, water-insoluble coating may be applied onto the polymer coated granule through nozzles within the second drum. The outer, water-insoluble layer, for example a wax may be applied at a temperature of about 120° F. to about 250° F., or any temperature therebetween, for example from about 150° F. to about 200° F., about 170° F., or about 120, 125, 130, 135, 140, 145, 150, 155, 160, 165, 170, 175, 180, 185, 190, 195, 200, 205, 210, 220, 240, 230, 240, 250° F., or any amount therebetween, for example about 160° F.

The present invention therefore provides a process for producing a controlled release fertilizer composition comprising coating a plant nutrient compound with two or more than two precursor compounds that react to form a polymer comprising from about 1.2% to about 3.0% on a weight basis, applying a component or composition onto the polymer to form an intermediate layer of from about 0.1 to about 0.8% on a weight basis, and spraying molten sulfur of from about 1.7% to about 15% on a weight basis onto the intermediate layer to form a sulfur layer. The plant nutrient composition is from about 37% N to about 44% N on a weight basis of the total ingredients of the controlled release fertilizer composition. If desired, an outer water-insoluble layer may be applied over the sulfur layer comprising from about 0.1 to about 0.8% by weight. If the polymer is a thermosetting polymer, then the polymer is coated at a temperature sufficient to form a thermoset polymer.

The release rate and durability of the controlled release fertilizer composition as described herein may be determined for example, following an Impact Test or other test used to determine the integrity of the coated fertilizer product. The impact test may involve dropping for example, 60 grams of the coated product through a 20 foot long, 3-6 inch diameter tube onto a metal plate, followed by determining the release rate of the fertilizer component from the abraded fertilizer product. To determine the aqueous release rate, about 10-20 grams of the abraded fertilizer are placed in 150-200 ml of water, and samples are drawn at different time intervals—for example, at 2 hours, 1 day, 3 days 7 days, 14 days and 21 days, and the sample tested using an appropriate test for the fertilizer material. For example, in the case of a urea-based fertilizer, urea and ammoniacal nitrogen of the sample may be determined using any suitable test, for example, the methods outlined by the Association of Official Analytical Chemists (AOAC).

Figure 1B:
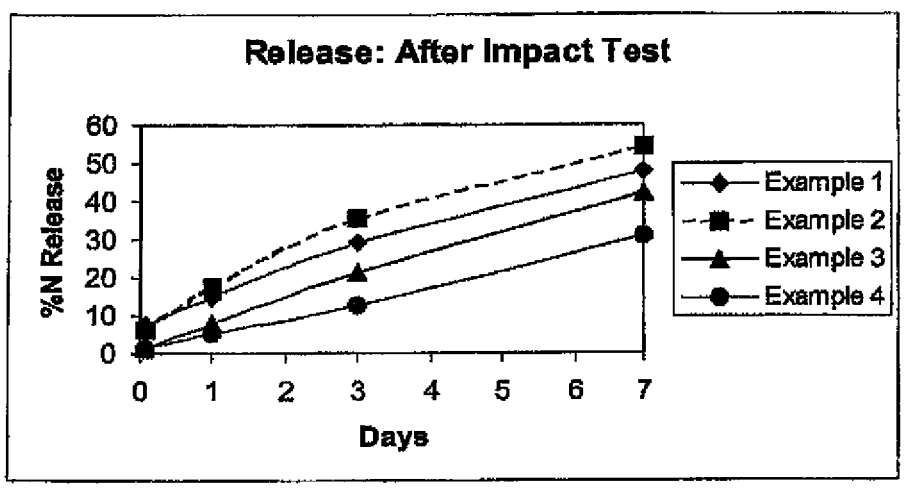

Results from such testing demonstrate that the controlled release fertilizer composition of the present invention comprising, in series, a polyurethane layer that surrounds the fertilizer core, and having for example 1.8% by weight of the total weight of the fertilizer composition, a wax coat (0.3% by weight), a sulfur coat (3.8% by weight) which is coated with a wax layer (0.5% by weight; see product 43 N-1.8PU-0.3W-3.8S-0.5W, produced according to Example 3, Table 1, and FIGS. 1A, and 1B) provides effective time release of the fertilizer component when compared to prior art controlled release compositions comprising in series, a sulfur layer that surrounds the fertilizer core (5% by weight of the total weight of the fertilizer composition), a polyurethane layer (2.8% by weight) and a wax coat (0.5% by weight see the product produced according to Example 1, 42N-5S-2.8PU-0.5W; Table 1, and FIGS. 1A and 1B). Increasing the amount of polyurethane on a % weight basis from 1.8% to 2.5% (see the Product described in Example 4; 43N-2.5PU-0.3W-3.8S-0.5W; Table 1 and FIGS. 1A and 1B), further decreases the rate of release of nitrogen from the fertilizer composition.

Analysis of the costs associated with produced the controlled release fertilizer of the present invention, for example the product described in Example 3 (see Table 1; 43 N-1.8PU-0.3W-3.8S-0.5W; and FIGS. 1, and 2) indicate a significant cost saving, when compared with the product as described in Example 1 (see Table 1; 42 N-ss-2.8PU-0.5W; FIGS. 1 and 2), or with other controlled fertilizer release properties with a polymer coating that surrounds the fertilizer core and the exterior of the sulfur coating for example, as described in U.S. Pat. No. 6,338,746. A controlled release fertilizer composition such as that described in Example 3 of the present invention, (43 N1.8PU-0.3W-3.8S-0.5W) has a cost index of: 8.63, compared with a cost index of 9.58 for the prior art product described in Example 1 (42 N-5S-2.8PU-0.5W). Where the cost index is determined by calculating the cost to produce the controlled release fertilizer (including the cost of each component, and production and handling costs to manufacture the product) per unit nitrogen within the fertilizer product.

The cost index may be further reduced by reducing the amount of polymer used in the polymer layer, while still maintaining desired release properties. For example a product comprising 1.2% polyurethane has a cost index of 8.43. Controlled release fertilizer product comprising 2.8% polyurethane (for example the product described in Example 4; (43N-2.8PU-0.3W-2.2S-0.5W) also exhibits a lower cost index (9.43) when compared to prior art (Example 1; 42N-5S-2.8PU-0.5W) that has a cost index of 9.58.

The controlled released fertilizer of the present invention will be illustrated with reference to the following examples.

The controlled release fertilizer compositions of the following examples were prepared essentially as described in U.S. Pat. No. 5,599,374 (see for example Column 5, line 21 to Column 6 line 33; which is incorporated herein by reference) but this method was modified to apply the coatings in the order as described in the examples. The method essentially involves preheating urea granules (size range from about 1.0 to about 3.0 mm) with hot air to about 160° F. to about 180° F., and coating the heated granules with the desired combination of components using a series of application nozzles within one or more drums If a polyurethane coating is to be applied (as in Examples 2, 3 and 4), the heated granules are coated with precursor compounds to produce the polymer coating. For example, a mixture of polymeric MDI (4,4 diphenylmethane diisocyanate), TEA (triethanolamine) and DEG (diethylene glycol)polyols are applied to the fertilizer granules, and the polymer components polymerize on the surface of the granules to form the polymer coating.

If the polymer coating is covered with a wax layer (as in Examples 3 and 4), then the polymer coated granules are brought into contact with the wax at a temperature of about 120° F. to about 250° F., for example about 160° F., and the wax is applied onto the polymer coated granule. The wax-polymer coated urea is then withdrawn from the first drum and conveyed to a second rotating drum and brought into contact with molten sulfur at a temperature of from about 280° F. to about 310° F., for example about 290° F. which is sprayed over top of the wax coating. A second wax coating is applied to the sulfur coated granule using application nozzles within the second drum and applied at a temperature of about 120° F. to about 250° F., for example about 160° F.

If the fertilizer core is first coated with a sulfur layer (as in Example 1), then molten sulfur is applied to the heated fertilizer granule at a temperature of approximately 280°-310° F. The sulfur-coated urea granules then are transferred into a second rotating drum and coated with precursor compounds to produce the polymer coating including a mixture of polymeric MDI (4,4 diphenylmethane diisocyanate), TEA (triethanolamine) and DEG (diethylene glycol)polyols which is applied to the fertilizer granules, and the polymer components polymerize on the surface of the granules to form the polymer coating. The polymer coated granule is then coated with a wax layer at a temperature of about 120° F. to about 250° F., for example about 160° F.

If the fertilizer core is coated with polyurethane, and sulfur (as in Example 2), then the polyurethane coated fertilizer granule is coated with a sulfur layer at a temperature of approximately 280°-310° F. The sulfur-coated urea granules are then coated with a layer of wax using application nozzles within the second drum and applied at a temperature of about 120° F. to about 250° F., for example about 160° F.

The fertilizer compositions as produced above may then be cooled with cool air to a temperature in the range of about 95° F. to about 115° F., for example using a fluid bed cooler. The granules may then be sized, stored, and packaged.

EXAMPLES

Example 1

42N-5S-2.8PU-0.5W (Comparative Example)

In this Example, a controlled release fertilizer material was prepared according to the teachings of U.S. Pat. No. 5,599,374 by Detrick (see for example Column 2 line 65 to Column 3, line 22; which is incorporated herein by reference), with addition of an external wax layer applied as described above. The urea granule (91.7% by weight of the total fertilizer composition; which provides a 42% by weight nitrogen (42N) contribution) is first coated with sulfur followed by a coating of thermoset polymer (DEG-TEA polyol and diisocyanate, MDI) and a coating of wax. The sulfur coating has a thickness achieved by a weight percentage application of about 5% (5S) based on the total weight of the granule, a polymer layer of about 2.8 vvt % (2.8PU) based on the total weight of the granule, and a wax layer of about 0.5 wt % (0.5W) based on the total weight of the granule (shorthand descriptor: 42N-5S-2.8PU-0.5W).

Example 2

42N-2.8PU-5S-0.5W (Comparative Example)

The urea granule (91.7% by weight of the total fertilizer composition which provides a 42% by weight nitrogen (42N) contribution) has a first coating of thermoset polymer (DEA-TEG with MDI; composition as described in Example 1), followed by a layer of sulfur and then followed by a layer of wax. The first polymer coating has a thickness achieved by a weight percentage application of about 2.8% (2.8PU) based on the total weight of the granule, the sulfur layer of about 5% (5S) and wax layer of 0.5% (0.5W), either an intermediate wax, a paraffin wax, or an alpha-olefin wax, based on the total weight of the granule (shorthand descriptor: 42N2.8PU-5S-0.5W).

Example 3

43N-1.8PU-0.3W-3.8S-0.5W

In this Example, a controlled release fertilizer was prepared in accordance with the present invention, however it is to be understood that other compositions may be prepared as described in the present invention.

The urea granule (93.6% by weight of the total fertilizer composition; which provides a 43% by weight nitrogen (43N) contribution) has a first coating of thermoset polymer (DEA-TEG with MDI; composition as described in Example 1), followed by a layer of wax, followed by a layer of sulfur and then followed by a layer of wax. The polymer coating has a thickness achieved by a weight percentage application of about 1.8% (1.8PU) based on the total weight of the granule, the first wax layer of about 0.3% (0.3W), the sulfur layer of about 3.8% (3.8S) and wax layer of about 0.5% (0.5W), either an intermediate wax, a paraffin wax, or an alpha-olefin wax, based on the total weight of the granule (shorthand descriptor: 43N-1.8PU0.3W-3.8S-0.5W).

Example 4

43N-2.8PU-0.3W-2.28-0.5W

In this Example, a controlled release fertilizer was prepared in accordance with the present invention, however it is to be understood that other compositions may be prepared as described in the present invention.

The urea granule (94.5% by weight of the total fertilizer composition; which provides a 43% by weight nitrogen (43N) contribution) has a first coating of thermoset polymer (DEA-TEG with MDI; composition as described in Example 1), followed by a layer of wax, followed by a layer of sulfur and then followed by a layer of wax. The polymer coating has a thickness achieved by a weight percentage application of about 2.5% (2.5PU) based on the total weight of the granule, the wax layer of about 0.3% 0.3W), the sulfur layer of about 2.2% (2.2S), and wax layer of about 0.5% (0.5W), either an intermediate wax, a paraffin wax, or an alpha-olefin wax, based on the total weight of the granule (shorthand descriptor: 43N-2.8PU0.3W-2.2S-0.5W).

Example 5

Rate of Release of Nitrogen (N) from Controlled Release Fertilizer Compositions

The controlled release fertilizer compositions prepared in Example 1-4 were tested for the rate of release of the fertilizer core before, and after the impact test. The results of this test are shows in Table 1 and FIGS. 1A and 1B.

TABLE 1

% Nitrogen released of example compositions before and after impact test.

| | % N released, cumulative | | | | | | |
|---|---|---|---|---|---|---|---|
| | 2 Hrs | Day 1 | Day 3 | Day 7 | Day 14 | Day 21 | Cost Index |
| Before Impact test (20° C.) | | | | | | | |
| Comparative Example 1 (42N—5S—2.8PU—0.5W) | 1.3 | 4.3 | 11 | 24 | 45 | 59.4 | 9.58 |
| Comparative Example 2 (42N—2.8PU—5S—0.5W) | 0.38 | 12 | 22.8 | 36.2 | 52.5 | 64.1 | — |
| Example 3 (43N—1.8PU—0.3W—3.8S—0:5W) | 0.4 | 1.9 | 6.7 | 19.5 | 45.3 | 63.6 | 8.63 |
| Example 4 (43N—2.8PU—0.3W—2.2S—0.5W). | 0.4 | 1.1 | 4.1 | 13.3 | 40.1 | 61 | 9.43 |
| After Impact Test (30° C.) | | | | | | | |
| Comparative Example 1 (42N—5S—2.8PU—0.5W) | 7.2 | 14.6 | 29 | 48 | 73.6 | 85 | 9.58 |
| Comparative Example 2 (42N—2.8PU—5S—0.5W) | 6.1 | 17.5 | 35.8 | 54.4 | 73.2 | 83.5 | — |
| Example 3 (43N—1.8PU—0.3W—3.8S—0.5W) | 1.5 | 7.9 | 21.5 | 42.2 | 70.2 | 83.7 | 8.63 |
| Example 4 (43N—1.8PU—0.3W—3.8S—0.5W) | 1.1 | 5.2 | 12.5 | 30.9 | 63.7 | 81.3 | 9.43 |

As shown in Table 1, and FIGS. 1 and 2, controlled release fertilizer products described according to the present invention comprising a inner fertilizer core coated with, in series, a polymer layer, an intermediate layer, a sulfur layer and an outer, water-insoluble layer such as 43N-1.8PU-0.3W-3.8S-0.5W (Example 3) or 43N2.8PU-0.3W-2.2S-0.5W (Example 4) exhibit a similar or slower fertilizer release rate (19.5% N release or 13.3% N release over 7 days, before impact test, or 42.2% and 30.9% N release over 7 days after drop test) when compared to the prior art product, 42N-5S-2.8PU-0.5W (Example 1), that comprises more polyurethane on a per weight basis (24% N release over 7 days before impact test, or 48% N release after impact test).

The costs associated with production of the fertilizer products are determined by calculating the cost to produce the controlled release fertilizer, including the cost of each component, and production and handling costs to manufacture the product, expressed per unit nitrogen within the fertilizer product, to obtain a cost index. As indicated in Table 1, 43 N-1.8PU-0.3W-3.8S-0.5W (Example 3) has a cost index of 8.63, compared with a cost index of 9.58 for the prior art product 42 N-5S-2.8PU0.5W (Example 1), or a cost index of 9.43 for 43N-2.8PU-0.3W-2.2S-0.5W, Example 4.

All citations are hereby incorporated by reference.

The present invention has been described with regard to one or more embodiments. However, it will be apparent to persons skilled in the art that a number of variations and modifications can be made without departing from the scope of the invention as defined in the claims.

The invention claimed is:

1. A controlled release fertilizer composition, comprising:
   a) a core comprising one or more plant nutrient materials;
   b) a polymer layer coating the core, wherein the polymer layer comprises a polymer formed on the core from two or more precursor compounds;
   c) a sulfur layer overlying the polymer layer;
   d) an intermediate layer between the polymer layer and the sulfur layer, wherein the intermediate layer functions as a lubricant when applying the sulfur layer; and
   e) optionally an outer, water-insoluble layer.

2. The control release fertilizer of claim 1, wherein the core comprises nitrogen, phosphorus, potassium, sulfur, micronutrients or mixtures thereof.

3. The controlled release fertilizer of claim 1, wherein the core comprises urea.

4. The controlled release fertilizer of claim 1, wherein the precursor compounds comprise an isocyanate and a polyol.

5. The controlled release fertilizer of claim 4, wherein the isocyanate comprises a diisocyanate.

6. The controlled release fertilizer of claim 4, wherein the isocyanate comprises a polyisocyanate.

7. The controlled release fertilizer of claim 4, wherein the isocyanate comprises 4,4 diphenylmethane diisocyanate, 1,6-hexamethylene diisocyanate, 2,4-toluene diisocyanate, 2,6-toluene diisocyanate, 2,4'-diphenylmethane diisocyanate, or 4,4'-diphenylmethanie diisocyanate.

8. The controlled release fertilizer of claim 1, wherein the precursor compounds comprise a polyol.

9. The controlled release fertilizer of claim 8, wherein the polyol comprises a glycol.

10. The controlled release fertilizer of claim 8, wherein the polyol comprises diethylene glycol polyol, orthophathalate diethylene glycol based polyester polyols, terephthalate-diethylene glycol based polyester polyols, castor oil, oils modified to contain amine or OH groups comprising modified tung oil, soybean oil, canola oil, sunflower oil, or linseed oil, oleo-polyols comprising epoxidized castor oil, epoxidized sunflower oil, or epoxidized linseed oil, polyether polyols, castor oil derivatives comprising partial hydrolysates of castor oil formed by reacting castor oil with a polyol selected from diols comprising ethylene glycol or dipropylene glycol, or esters formed by reactions between ricinoleic acid and ethylene glycol, or dipropylene glycol.

11. The controlled release fertilizer of claim 1, wherein the precursor compounds comprise a polyol and a polyisocyanate and the polymer comprises a polyurethane.

12. The controlled release fertilizer of claim 1, wherein the precursor compounds comprise MDI and DEG-TEA polyol.

13. The controlled release fertilizer of claim 1, wherein the intermediate layer is a wax.

14. The controlled release fertilizer of claim 13, wherein the wax comprises intermediate petroleum wax, alpha olefin wax, polyethylene wax, paraffin wax, silicon wax, slack wax, microcrystalline wax, or natural wax.

15. The controlled release fertilizer of claim 13, wherein the wax comprises intermediate petroleum wax, paraffin wax, or polyolefin wax.

16. The controlled release fertilizer of claim 1, wherein the one or more plant nutrients are about 37%-44% N on a weight basis, the polymer is about 1.2%-3.0% on a weight basis, the intermediate layer is about 0.1%-0.8% on a weight basis, the sulfur layer is about 1.7%-15% on a weight basis and the optional outer layer is about 0.1%-0.8% on a weight basis.

17. A controlled release fertilizer composition, comprising:
 a) a core comprising one or more plant nutrient materials;
 b) a thermoset polymer layer coating the core, wherein the thermoset polymer layer is from precursor compounds comprising MDT and DEG-TEA polyol;
 c) a sulfur layer overlying the polymer layer;
 d) an intermediate wax layer coated between the polymer layer and the sulfur layer, wherein the intermediate layer comprises an alpha olefin wax that functions as a lubricant when applying the sulfur layer; and
 e) optionally an outer, water-insoluble layer.

18. A method of producing a controlled release fertilizer composition, comprising the steps of:
 a) coating one or more plant nutrient materials with two or more precursor compounds under conditions effective to form a polymer layer coating a core comprising the one or more plant nutrient materials;
 b) coating a lubricant onto the polymer layer;
 c) applying molten sulfur onto the lubricant under conditions effective to form a sulfur layer comprising solidified sulfur; and
 d) optionally applying an outer layer onto the sulfur layer.

19. The method of claim 18, wherein the one or more plant nutrients comprise urea.

20. The method of claim 18 wherein the lubricant comprises intermediate petroleum wax, alpha olefin wax, polyethylene wax, paraffin wax, silicon wax, slack wax, microcrystalline wax, or natural wax.

21. The method of claim 18, wherein the two or more than two precursor compounds are a polyisocyanate and a polyol and the step of coating the one or more plant nutrients with two or more than two precursor compounds reactive to form a polymer is at a temperature sufficient to form a polyurethane polymer.

22. The method of claim 18, wherein the one or more plant nutrients are about 37%-44% N on a weight basis, the thermoset polymer is about 1.2%-3.0% on a weight basis, the lubricant is about 0.1%-0.8% on a weight basis, the sulfur is about 1.7%-15% on a weight basis and the optional outer layer is about 0.1%-0.8% on a weight basis.

23. A method of producing a controlled release fertilizer composition, comprising the steps of:
 a) coating a lubricant onto a particle comprising a polymer layer that coats a core comprising at least one plant nutrient material;
 b) coating molten sulfur onto the lubricant under conditions such that the lubricant helps the molten sulfur form a more uniform sulfur coating comprising solidified sulfur.

24. A method of producing a controlled release fertilizer particle comprising the steps of:
 a) coating one or more plant nutrients with two or more than two precursor compounds reactive to form a polyurethane polymer layer;
 b) applying a lubricant onto the polymer layer;
 c) spraying molten elemental sulfur onto the lubricant to form a sulfur layer; and
 d) applying a wax layer onto the sulfur layer to form the controlled release fertilizer particle.

25. The controlled release fertilizer of claim 24, wherein the lubricant comprises a component selected from the group consisting of a wax, an oil, a lubricant, a surfactant, and a combination thereof.

26. The controlled release fertilizer of claim 25, wherein the lubricant comprises a wax.

27. The controlled release fertilizer of claim 26, wherein the lubricant comprises intermediate petroleum wax, alpha olefin wax, polyethylene wax, paraffin wax, silicon wax, slack wax, microcrystalline wax, or natural wax.

28. The controlled release fertilizer of claim 24, wherein the wax layer comprises intermediate petroleum wax, alpha olefin wax, polyethylene wax, paraffin wax, silicon wax, slack wax, microcrystalline wax, or natural wax.

* * * * *